United States Patent [19]

Peters

[11] 4,263,938
[45] Apr. 28, 1981

[54] RELAY VALVE FOR FLUID ACTUATORS

[75] Inventor: Clifford M. Peters, Longview, Tex.

[73] Assignee: W-K-M Wellhead Systems, Inc., Shreveport, La.

[21] Appl. No.: 170,299

[22] Filed: Jul. 18, 1980

Related U.S. Application Data

[62] Division of Ser. No. 57,490, Jul. 13, 1979.

[51] Int. Cl.³ .................. F15B 13/04; F16K 37/00
[52] U.S. Cl. .................. 137/557; 137/458; 137/624.27; 137/625.66
[58] Field of Search .................. 137/458, 557, 624.27, 137/625.66

[56] References Cited

U.S. PATENT DOCUMENTS

| 4,004,610 | 1/1977 | Theriot | 137/625.68 X |
| 4,137,942 | 2/1979 | Hargraves | 137/624.27 X |
| 4,145,025 | 3/1979 | Bergeron | 137/625.66 X |

Primary Examiner—Gerald A. Michalsky
Attorney, Agent, or Firm—Eugene N. Riddle; Stephen T. Belsheim

[57] ABSTRACT

A relay valve for controlling fluid flow to and from a valve actuator included in a safety system for a flowline such as a production line of an oil or gas well. The relay includes a slide valve (60) which is manually pushed inwardly to the open or set position and held therein by pilot fluid which is also applied to the valve actuator. A visual indicator mounted on a knob (102) of the slide valve is operated by fluid applied to a passage (96) formed in the slide valve. A vent port (82) prevents pilot pressure from moving the slide valve from the closed position to the open position. A modified relay valve (150) has separate inlet ports (198 and 200) for receiving pilot fluid and actuator fluid and a vent port (206) which is in direct fluid communication with the pilot port in the closed position of the slide valve.

11 Claims, 8 Drawing Figures

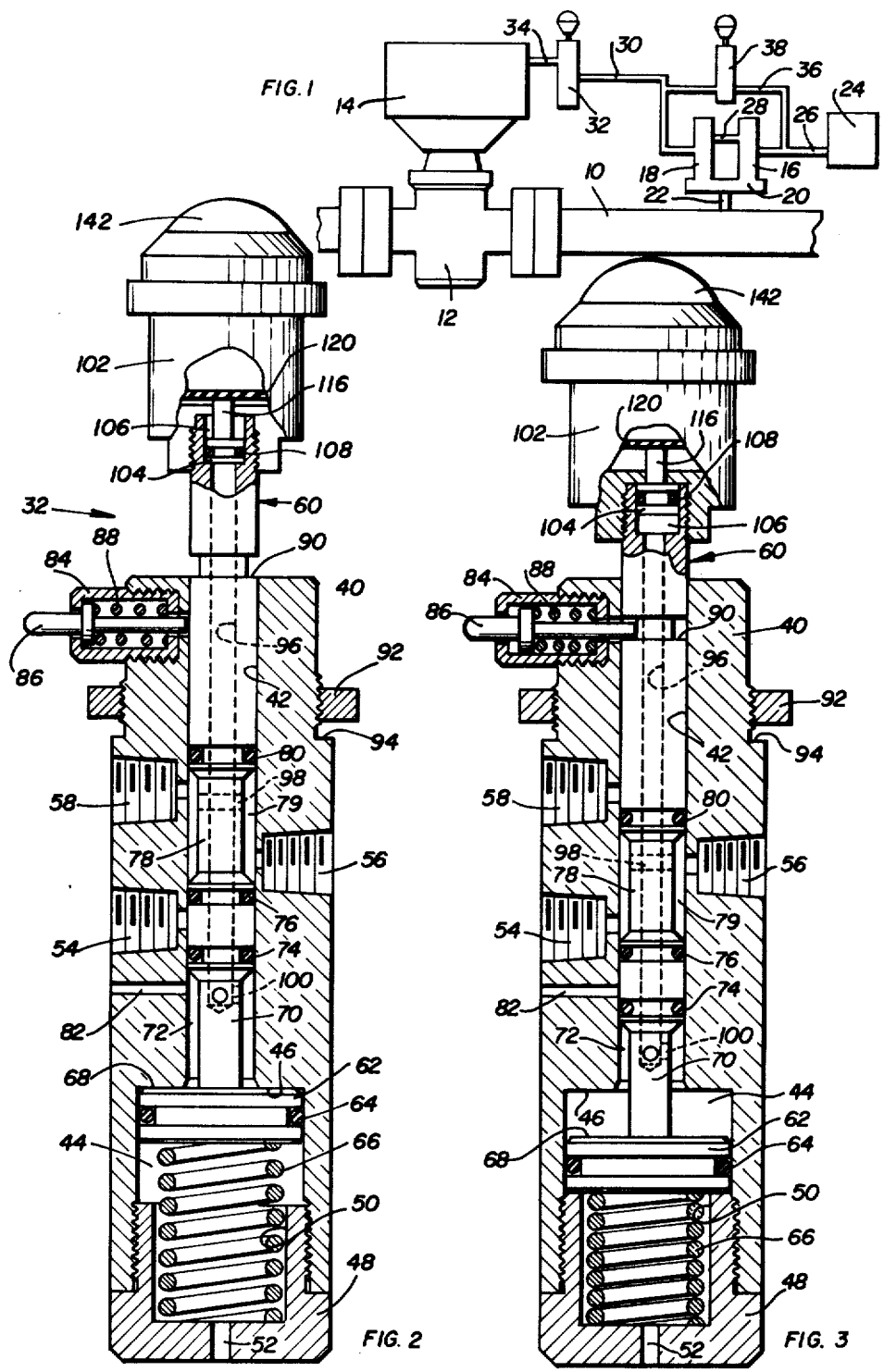

RELAY VALVE FOR FLUID ACTUATORS

This application is a division of application Ser. No. 057,490, filed July 13, 1979.

BACKGROUND OF THE INVENTION

This invention relates generally to relay valves and deals more particularly with a manually set relay valve of the type used in fluid control systems such as safety systems for oil and gas wells.

Pilot operated relay valves are commonly used in safety systems which shut-in well production lines or other flowlines in the event of unduly high or low pressure conditions. The relay is operated by pilot pressure and includes a slide valve which controls fluid flow to and from a gate valve actuator. The gate valve is closed by the actuator if the flowline pressure, as sensed by a pair of pressure sensitive pilots, is outside of the operating range of the safety system. Once the relay has moved to the closed position due to cut off of the pilot pressure, it is reset manually after correction of the problem which caused the unusual pressure condition in the flowline.

Although most relay valves have been pull type valves in which the slide valve is pulled outwardly to its set operating position, push type relays have also been proposed, as exemplified by U.S. Pat. Nos. 4,004,610 and 4,145,025. Because the push type relay has a slide valve which is pushed inwardly when it is set in the normal operating position, the slide valve is almost fully retracted within the valve body and only a small part is exposed under normal operating conditions. The push type slide valve is thus effectively shielded from foreign materials which could otherwise form deposits that might interfere with proper operation of the relay, particularly when it is used in an offshore facility or another location where it is exposed to salt, sand, or other foreign substances.

For safety reasons, it is desirable for the relay valve to be constructed such that it remains in the fired or closed position until it is manually reset. Thus, a resumption of pilot pressure following cut-off does not open the relay, and the problem which caused the relay to fire can be corrected before the flowline is again open to flow. The arrangements that have been used in the past to achieve such a lockout of the relay have been less than satisfactory in a number of respects. For example, the relay shown in U.S. Pat. No. 3,877,484 requires an unduly complex valve body and slide valve, while the arrangements of U.S. Pat. Nos. 4,094,340 and 4,145,025 suffer from the same problems as well as relying on close tolerances and the integrity of O-ring seals to establish a necessary pressure condition in the valve.

It has also been proposed to provide relay valves with visual indicators, as disclosed in U.S. Pat. Nos. 4,137,942 and 4,121,615. However, only pull type relays are disclosed in these patents, and push type relay valves such as those shown in U.S. Pat. Nos. 4,004,610 and 4,145,025 are not equipped with visual indicators. The indicators which have been proposed for relay valves have not included a positive means for limiting the movement of the indicator mechanism. Therefore, high fluid pressure applied to the indicator can damage the indicator linkage by moving it beyond its intended operating range.

Relay valves most often have one port for receiving pilot fluid to hold the slide valve open and another separate supply or inlet port for receiving actuator fluid which is directed to the valve actuator in order to hold the gate valve open under normal conditions. The pilot fluid and actuator fluid are at different pressures in most situations and are thus isolated from one another. Another type of relay has a single inlet port and uses the same fluid to maintain the slide valve open and to supply the actuator. An example of this latter type of relay can be found in U.S. Pat. No. 4,004,610.

SUMMARY OF THE INVENTION

The present invention is directed to a push type relay valve having an improved lockout arrangement and a visual indicator. In a first embodiment of the invention, the relay has a slide valve with a knob on its outer end which may be pushed inwardly to set the valve in the open position. A single inlet port in the valve body receives incoming fluid which is used to supply the valve actuator and which is also applied to a piston chamber in the valve body in order to hold the slide valve open. A passage in the slide valve is sealed from the inlet port when the relay is closed and provides a fluid path between the inlet port and piston chamber when the relay is open. A vent port in the valve body prevents passage of fluid from the inlet port toward the piston chamber when the relay is closed, thereby achieving automatic lockout of the slide valve and requiring it to be manually reset in the open or operating position of the relay.

A visual indicator mounted on the knob of the slide valve responds to fluid pressure in the passage to provide a visual indication of the position of the slide valve. A pressure responsive piston which operates the indicator mechanism is limited to movement between a pair of stops in order to prevent over travel which could damage the indicator.

In an alternative embodiment of the invention, the valve body has a pilot port for receiving pilot fluid and a separate supply port for the actuator fluid. When the relay is closed, a vent port communicates directly with the pilot port through an annular chamber formed about a reduced diameter portion of the slide valve. The pilot pressure is thus vented if it should resume after having been cut off due to an unusual pressure condition in the flowline. The pilot fluid is isolated at all times from the actuator fluid by O-rings carried on the slide valve.

DETAILED DESCRIPTION OF THE INVENTION

In the accompanying drawings which form a part of the specification and are to be read in conjunction therewith:

FIG. 1 is a diagrammatic view showing a fluid controlled safety system which includes a pilot operated relay valve constructed in accordance with a first embodiment of the present invention;

FIG. 2 is a sectional view showing the relay valve of FIG. 1 in the closed or seated position;

FIG. 3 is a sectional view similar to FIG. 2, but showing the relay valve in its open or unseated position;

Figure 4:
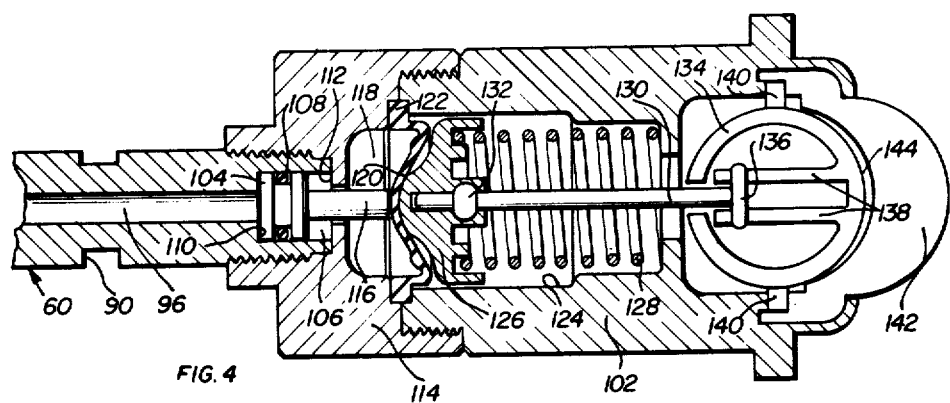
FIG. 4 is a fragmentary sectional view showing a visual indicator mechanism which may be included in the relay valve, with the indicator mechanism in a position indicating that the relay valve is closed.

FIG. 1 illustrates a safety system for controlling fluid flow through a main flowline 10 which is typically the production line of an oil or gas well. A conventional gate valve 12 forms a surface safety valve which is opened and closed by a hydraulic or pneumatic actuator 14 in order to open and close flowline 10. Actuator 14 maintains gate valve 12 in the open position when pressurized fluid is applied to the actuator, while bleeding of fluid from actuator 14 permits a spring or the like (not shown) to move valve 12 to the closed position.

The pressure in line 10 is sensed by pressure sensitive pilots in the form of a high pressure pilot 16 and a low pressure pilot 18. Pilots 16 and 18 are mounted on a manifold 20 which receives fluid from a short conduit 22 connected with flowline 10. A fluid source 24, such as a pressurized cylinder of gas or hydraulic fluid, applies pilot fluid to pilot 16 through a conduit 26. Extending between pilots 16 and 18 is a short conduit 28, while another conduit 30 extends from low pilot 18 to connection with a relay valve 32 which forms the first embodiment of the present invention. A conduit 34 extends from valve 32 to actuator 14. Bypassing pilots 16 and 18 is a conduit 36 which extends between conduits 26 and 30 and which is provided with a bypass valve 38.

High pressure pilot 16 is set to fire to the closed position if the pressure in flowline 10 exceeds a predetermined high pressure level corresponding to the setting of the high pilot. Conversely, low pilot 18 is set to fire to the closed position when the pressure in line 10 is below a predetermined low pressure level corresponding to the setting of the low pilot. Thus, an operating pressure range of the safety system is defined between the low pressure setting of pilot 18 and the high pressure setting of pilot 16. When the flowline pressure is within the operating range, fluid is delivered from source 24 through conduit 26, pilot 16, conduit 28, pilot 18, conduit 30, relay valve 32, and conduit 34 to actuator 14 in order to maintain valve 12 in the open position. Valve 38 is normally closed. If the flowline pressure drops below the setting of pilot 18, the flow from conduit 28 to conduit 30 is interrupted by pilot 18 and relay valve 32 fires to the closed position in order to bleed fluid from actuator 14 such that valve 12 is closed. If the pressure in line 10 rises above the setting of high pilot 16, flow is interrupted by pilot 16 between conduits 26 and 28 to cause firing of relay 32 to the closed position wherein fluid is bled from actuator 14 for closing of gate valve 12. Valve 38 may be temporarily opened in order to bypass pilots 16 and 18 when the safety system is initially set in the operating condition.

Referring now to the details of relay valve 32, FIGS. 2 and 3 show the relay in its respective closed and opened positions. Relay 32 includes a cylindrical valve body 40 having a longitudinal bore 42 of cylindrical shape. Bore 42 extends from the outer end of valve body 40 and terminates at its inner end in an enlarged bore portion which forms a cylindrical piston chamber 44 located within valve body 40 near the inner end thereof. A flat, annular shoulder 46 is presented at the intersection of bore 32 with piston chamber 44. An inner end cap 48 is threaded onto the inner end of body 40 and has a spring chamber 50 adjacent to piston chamber 44. A vent 52 is formed through the inner end of cap 48 to vent chamber 50 to the atmosphere.

Valve body 40 has a single inlet port 54 for receiving fluid which is used to supply actuator 14 and also to maintain relay valve 32 in its open position. Port 54 is internally threaded and is connected with conduit 30 to receive fluid therefrom. Port 54 extends into a side portion of body 40, and its inner end is reduced in size and connects with bore 42. An outlet port 56 is formed in a side portion of body 40 at a location outwardly of port 54. Port 56 is internally threaded for connection with conduit 34 in order to deliver fluid to actuator 14. Port 56 is likewise reduced in size at its inner portion and connects with bore 42. A bleed port 58 connects with bore 42 in order to exhaust fluid from actuator 14 when valve 32 is in the closed position. Port 58 is located outwardly of port 56 in a side portion of valve body 40.

Bore 42 receives an elongate cylindrical slide valve which is generally designated by reference numeral 60 and which is mounted for longitudinal sliding movement in bore 42. At its inner end, slide valve 60 carries a piston 62 which is located within piston chamber 44 and sealed to the wall thereof by an O-ring 64 carried in an annular groove of piston 62. A compression spring 66 located in spring chamber 50 acts against the inner end of piston 62 to continuously urge slide valve 60 outwardly to the closed position thereof. Piston 62 has a flat pressure face 68 which faces outwardly and which seats against shoulder 46 when slide valve 60 is in the closed or seated position.

Outwardly of piston 62, slide valve 60 has a reduced diameter portion 70 which is somewhat smaller in diameter than bore 42 such that an annular chamber 72 is formed in bore 42 about reduced diameter portion 70. Chamber 72 leads to piston chamber 44. A pair of spaced apart O-rings 74 and 76 are carried on slide valve 60 in a pair of annular grooves located outwardly of reduced diameter portion 70. Another reduced diameter portion 78 is formed on slide valve 60 intermediate the length thereof to form another annular chamber 79 located in bore 42 about portion 78. Reduced diameter portion 78 is located between O-ring 76 and another O-ring 80 carried in an annular groove on slide valve 60. In the open or unseated position of slide valve 60 shown in FIG. 3, O-rings 74 and 76 are located on opposite sides of a vent port 82 formed in valve body 60 at a location between port 54 and piston chamber 44. Vent port 82 leads to bore 42 and communicates with the atmosphere at its outer end. Port 82 connects with chamber 72 when slide valve 60 is in the closed or seated position of FIG. 2.

A detent mechanism for temporarily holding slide valve 60 in the open position includes a hollow sleeve fitting 84 which is threaded into the side of valve body 40 at a location near the outer end thereof. Sleeve 84 receives a sliding plunger 86 having an end projecting out of the sleeve. A compression spring 88 continuously urges plunger 86 outwardly. An annular groove formed in slide valve 60 provides a shoulder 90 which under the influence of spring 66 frictionally contacts the inner end of plunger 86 when slide valve 60 is pushed inwardly to the open position and plunger 86 is pushed inwardly into contact with shoulder 90, as shown in FIG. 3. Slide valve 60 is thus held in the open position while the fluid pressure builds up in chamber 44. When the fluid pressure has built up sufficiently in chamber 44 to overcome the force of spring 66, the frictional engagement between plunger 86 and shoulder 90 is released, and spring 88 pushes plunger 86 outwardly to the released position shown in FIG. 2.

A nut 92 is threaded onto valve body 40 in order to mount relay 32 to a panel or the like (not shown). The panel is received between nut 92 and a shoulder 94 formed on body 40.

Slide valve 60 is provided with a fluid passage 96 extending longitudinally therein. A cross port 98 is formed in reduced diameter portion 78 in order to provide an inlet to passage 96 which directs fluid from port 54 into passage 96 when slide valve 60 is in the open position. Port 98 is located between O-rings 76 and 80. Another cross port 100 is formed in reduced diameter portion 70 in order to provide an outlet for passage 96 which delivers fluid from passage 96 into annular chamber 72 and then to piston chamber 44. Port 100 is located between O-ring 74 and piston 62.

Figure 5:
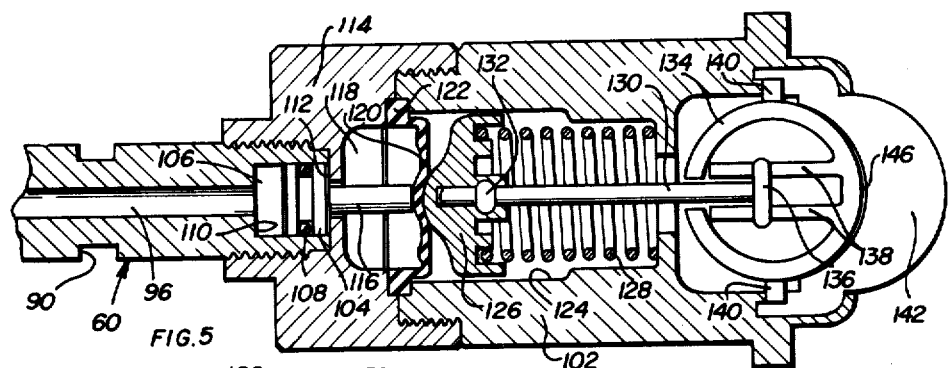
FIG. 5 is a fragmentary sectional view similar to FIG. 4, but with the indicator mechanism in a position indicating that the relay valve is open.

A knob 102 mounted on the outer end of slide valve 60 houses a visual indicator mechanism which is best shown in FIGS. 4 and 5. The indicator mechanism includes a small piston 104 which is mounted for reciprocating movement in a cylindrical piston chamber 106 formed in the outer end of slide valve 60 in fluid communication with passage 96. Piston 104 has an annular groove which carries an O-ring 108 forming a seal with the wall of piston chamber 106. An annular shoulder 110 defining the inner end of chamber 106 is defined by another annular shoulder 112 formed on a knob retainer 114. Shoulder 112 provides a stop which engages piston 104 in order to limit outward movement of the piston. Retainer 114 is threaded onto the outer end of slide valve 60.

Knob 102 is threaded onto retainer 114. Piston 104 has a stem 116 which extends outwardly into a chamber 118 formed partially in retainer 114 and partially in knob 102. A flexible diaphragm 120 has a circumferential ring portion 122 which is engaged between knob 102 and retainer 114 in order to mount the diaphragm. The outer end of stem 116 engages the center of diaphragm 120. A compression spring 128 is mounted in cavity 124 to continuously urge retainer 126 inwardly toward the position shown in FIG. 4, thereby urging piston 104 inwardly into contact with shoulder 110.

A connecting rod 130 has a ball joint connection with retainer 126 as indicated at 132 near the inner end of the connecting rod. The outer end of rod 130 is connected with a ball 134 which forms an indicator member providing a visual indication of the position of slide valve 60. The outer end of rod 130 has a cross pin 136 which is connected to a pair of arms 138 of ball 134 to provide an eccentric connection of rod 130 with the indicator ball. Ball 134 is mounted in knob 102 for pivotal movement about a central axis defined by a pair of stub axles 140 extending from opposite sides of ball 134.

The outer end of knob 102 carries a transparent lens 142 through which ball 134 is visible. The outer surface of ball 134 is colored in contrasting fashion in order to display different colors through lens 142 in the positions of FIGS. 4 and 5. For example, the surface portion 144 of ball 134 which is visible when the indicator mechanism is in the FIG. 4 position is preferably a color such as red which indicates the closed position of the relay valve 32. When the indicator mechanism is in the position of FIG. 5, the visible surface portion 146 of ball 134 is preferably a contrasting color, such as green which indicates the open or normal operating position of the relay valve.

The safety system shown in FIG. 1 is placed in service by setting relay valve 32 in the open position. This is accomplished by pushing inwardly on knob 102 to push slide valve 60 inwardly to the position shown in FIG. 3. Plunger 86 is then pressed inwardly to temporarily maintain the slide valve in the open position while the pressure builds up to a sufficient level. With relay valve 32 set in the open position, valve 38 is opened to permit fluid to flow through conduits 26, 36 and 30 and into valve 32 through port 54. The incoming fluid passes from port 54 to port 56 through the annular chamber 79 formed about reduced diameter portion 78 of slide valve 60. O-ring 76 seals port 54 and chamber 78 from vent port 82, while O-ring 80 seals port 56 from bleed port 58. O-ring 74 provides a seal between port 82 and chamber 72. Pressurized fluid is thus delivered to valve actuator 14 in order to open gate valve 12.

The fluid entering port 54 also passes into fluid passage 96 through cross port 98. The fluid in passage 96 flows through port 100 and annular chamber 72 into piston chamber 44 where it is applied to pressure face 68 of piston 62 in order to maintain slide valve 60 in the open position. Once the fluid pressure in piston chamber 44 has built up sufficiently, the pressure shifts slide valve slightly inwardly such that the frictional engagement between plunger 86 and shoulder 90 is automatically released to permit spring 88 to release the detent mechanism. The fluid pressure applied to piston 62 thereafter maintains slide valve 60 in the open position.

When the pressure in flowline 10 builds up sufficiently to exceed the setting of low pressure pilot 18, pilots 16 and 18 both open to permit fluid flow to valve 32 along conduits 26, 28 and 30. Valve 38 is then closed such that the fluid path through pilots 16 and 18 provides the only fluid path to relay 32. Relay 32 thus remains open to maintain valve 12 open so long as the pressure in flowline 10 is within the operating range of the safety system as determined by the settings of pilots 16 and 18.

If the pressure in line 10 rises above the setting of high pilot 16 or drops below the setting of low pilot 18, the appropriate pilot valve 16 or 18 closes to interrupt fluid flow to relay 32 and bleed the fluid from actuator 14 through conduit 30. The resulting pressure drop at port 54 permits spring 66 to push slide valve 60 outwardly from the open position to the closed position of FIG. 2. In this position, O-ring 76 provides a seal between ports 54 and 56, while annular chamber 79 provides fluid communication between ports 56 and 58. Actuator 14 is thus bled of fluid to effect closing of gate valve 12.

If the pressure at port 54 should resume for any reason, O-rings 74 and 76 are effective to prevent application of the fluid to piston chamber 44. O-ring 74 provides a seal between ports 54 and 82, while O-ring 76 provides a seal between port 54 and chamber 79. Consequently, relay valve 32 is automatically locked in the closed position and can be reset to the open position only by manual pushing of slide valve 60 inwardly. Even if O-ring 74 or another seal should leak, the leaking fluid is unable to reach chamber 44 since vent port 82 is in fluid communication therewith through annular chamber 72. An additional safety feature is thus provided to assure that valve 32 is locked in the closed position even if there is seal leakage. It is also pointed out that bleed port 58 is in fluid communication with chamber 72 through ports 98 and 100 and passage 96 when slide valve 60 is closed. Vent port 82 and O-ring 74 can thus be eliminated if desired, although it is preferred that they be included in the relay valve.

When slide valve 60 is in the open position shown in FIG. 3, the pressure in fluid passage 96 is applied to piston chamber 106 of the visual indicator mechanism. This pressure is applied against the inwardly facing pressure face of piston 104 to force piston 104 outwardly from the position of FIG. 4 to the position of FIG. 5, thereby pivoting ball 134 to the position wherein green surface 146 is visible through lens 142. Display of green surface 146 provides a visual indication that relay valve 32 is in the normal operating position to maintain valve 12 in the open position.

When slide valve 60 is in the closed position of FIG. 2 and the fluid pressure in passage 96 is relieved, spring 128 moves the indicator mechanism to the position of FIG. 4 wherein red surface 144 is visible through lens 142. This provides a visual indication that an unusual pressure condition in line 10 has occurred and that gate valve 12 is in the closed position.

It is pointed out that the travel of piston 104 is limited in both directions by the stationary abutments or shoulders 110 and 112 located at opposite ends of piston chamber 106. Consequently, piston 104 cannot travel excessively in either direction to possibly cause damage to connecting rod 130 or another part of the indicator mechanism. In addition, O-ring 108 provides an effective seal which shields the remainder of the indicator mechanism, including diaphragm 120, from high pressure conditions that may develop in fluid passage 96.

Figure 6:
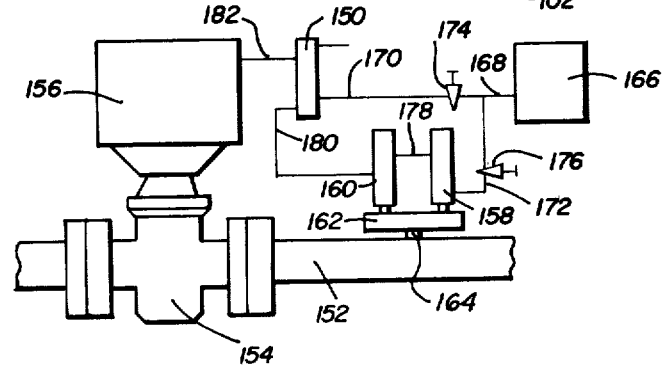
FIG. 6 is a diagrammatic view showing a fluid controlled safety system which includes a pilot operated relay valve constructed in accordance with a second embodiment of the invention.

Referring now to FIG. 6, another type of safety system includes a relay valve 150 constructed in accordance with a second embodiment of the present invention. The safety system shown in FIG. 6 includes a main flowline 152 which is controlled by a conventional gate valve 154. A pneumatic or hydraulic actuator 156 serves to move gate valve 154 between the open and closed positions to respectively open and close line 152 to fluid flow. Again, line 152 is typically the production line of an oil or gas well, although the safety system may be used with other types of flowlines. A high pilot 158 and a low pilot 160 are mounted on a manifold 162 which receives fluid from line 152 through a connecting conduit 164. Pilots 158 and 160 are identical to pilots 16 and 18 discussed previously in connection with the first embodiment of the invention. A fluid source 166 supplies pressurized fluid to a conduit 168 which connects with a pair of conduits 170 and 172 having respective pressure regulators 174 and 176. The pressure regulators permit conduits 170 and 172 to be maintained at different pressures. Conduit 172 leads to high pilot 158, while conduit 170 leads to relay 150. Conduit 178 extends between pilots 158 and 160, while conduit 180 leads from pilot 160 to relay valve 150. Conduit 182 leads from relay 150 to valve actuator 156 in order to apply fluid to the actuator for maintaining valve 154 in the open position.

Figure 7:
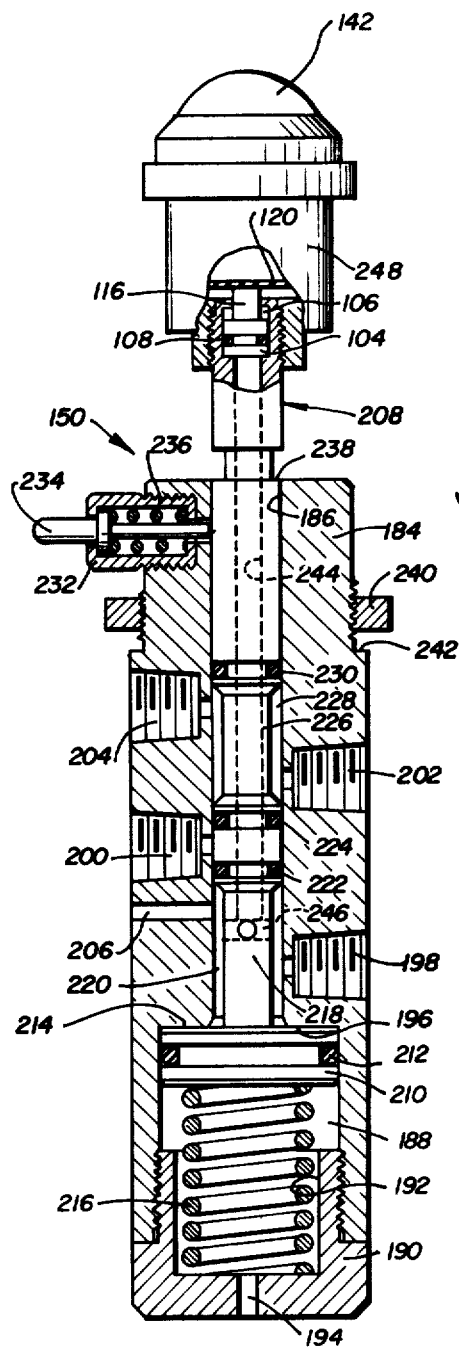
FIG. 7 is a sectional view showing the relay valve of FIG. 6 in its closed or seated position.
Figure 8:
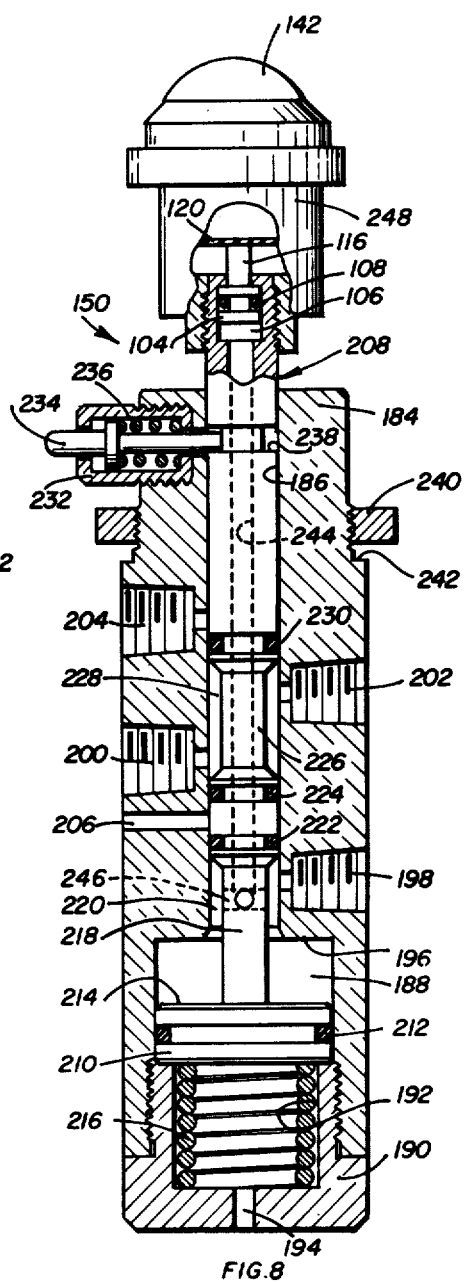
FIG. 8 is a sectional view similar to FIG. 7, but showing the relay valve in its open or unseated position.

Referring now more particularly to FIGS. 7 and 8, relay valve 150 is illustrated in detail. A cylindrical valve body 184 has a longitudinal bore 186 which terminates at its inner end in an enlarged cylindrical piston chamber 188 located near the inner end of body 184. A cap 190 is threaded onto the inner end of body 184 and presents a chamber 192 in fluid communication with piston chamber 188. A vent 194 is formed through the inner end of cap 190. Piston chamber 188 terminates at its outer end in a flat annular shoulder 196.

Valve body 184 has a pilot port 198 in its side which is internally threaded and connected with line 180. Port 198 is located outwardly of piston chamber 188. An inlet or supply port 200 is formed in the side of body 184 at a location outwardly of port 198. Port 200 is likewise threaded and is connected with line 170 in order to deliver actuator fluid to valve 150. An outlet or actuator port 202 is connected with line 182 in order to direct fluid to actuator 156. Port 202 is formed in the side of body 184 at a location outwardly of port 200. Valve body 184 has a bleed port 204 in its side at a location outwardly of port 202. Ports 198–204 are all reduced in size at their inner ends and all of the ports lead to connection with bore 186. A vent port 206 is formed in the side of valve body 184 at a location between pilot port 198 and supply port 200.

Valve body 184 receives a slide valve 208 which is mounted for longitudinal sliding movement in bore 186. The inner end of slide valve 208 extends into piston chamber 188 and carries an enlarged piston 210. Piston 210 is sealed to the wall of chamber 188 by an O-ring 212 carried in an annular groove formed in the piston. Piston 210 has a flat outwardly facing pressure face 214 for receiving the pilot fluid delivered to port 198 when slide valve 208 is in the open position of FIG. 8. A compression spring 216 is received in chamber 192 and acts against piston 210 to continuously urge slide valve 208 outwardly toward the closed position shown in FIG. 7 wherein face 214 seals against shoulder 196.

Outwardly of piston 210, slide valve 208 has a reduced diameter portion 218 which is smaller in diameter than bore 186. An annular chamber 220 is thus presented within bore 208 about reduced diameter portion 218. Chamber 220 connects with piston chamber 188. A pair of spaced apart O-rings 222 and 224 are carried in annular grooves formed in slide valve 208 at locations outwardly of reduced diameter portion 218. Another reduced diameter portion 226 is formed on slide valve 208 outwardly of portion 218 to present another annular chamber 228 in bore 186 about portion 226. An O-ring 230 is carried on slide valve 208 in an annular groove located outwardly of portion 226.

A sleeve fitting 232 is threaded into the side of valve body 184 and receives a plunger 234 which is continuously urged outwardly by a compression spring 236. An annular groove is formed in slide valve 208 to provide a shoulder 238 which frictionally contacts the inner end of plunger 234 in order to temporarily hold slide valve 208 in the set or open position in the same manner as described in connection with the first embodiment of the invention. A nut 240 is threaded onto valve body 184 to cooperate with a shoulder 242 in order to mount relay valve 150 to a panel or the like (not shown).

A fluid passage 244 is formed in slide valve 208 in extension longitudinally therein. A cross port 246 connects with passage 244 and is located in reduced diameter portion 218 of slide valve 208. The outer end of slide valve 208 has a knob 248 mounted thereon which is identical to the knob 102 described previously in connection with the first embodiment of the invention. Knob 248 is provided with a visual indicator mechanism identical to that illustrated in FIGS. 4 and 5.

The safety system illustrated in FIG. 6 is initially set in service by manually pushing in on knob 248 to push slide valve 208 inwardly to the open position shown in FIG. 8. The slide valve may be temporarily held in the open position by depressing plunger 234. With slide valve 208 in the open position, the actuator fluid supplied to conduit 170 is directed through port 200, annular chamber 228, port 202, and conduit 182 to actuator 156 in order to open valve 154. After valve 154 has opened, the pressure in flowline 152 begins to build up until it rises within the operating range of the safety system, as determined by the settings of pilots 158 and 160. When the pressure in flowline 152 has built up above the setting of low pilot 160, pilots 158 and 160 are both open to direct pressure to pilot port 198 through conduit 180. The fluid pressure at port 198 is applied to piston chamber 188 and against pressure face 214 of piston 210 in order to hold the slide valve 208 in the open position. Plunger 234 releases automatically when sufficient pressure is applied to chamber 188. The pressure at pilot port 198 is also applied to port 246 and through passage 244 to the visual indicator mechanism housed within knob 248. When chamber 106 is exposed to sufficient fluid pressure, a green color is visible through lens 142 to provide a visual indication that slide valve 208 is in the open position to maintain gate valve 154 in the open position.

So long as the pressure in flowline 152 remains within the operating range of the safety system, pilots 158 and 160 remain open to maintain relay valve 150 in the open position. However, if the pressure in line 152 drops below the setting of low pilot 160 or rises above the setting of high pilot 158, the appropriate pilot closes to exhaust fluid from line 180. This relieves the pressure at pilot port 198 and permits spring 216 to move slide valve 208 to the closed position shown in FIG. 7. In this position, ports 202 and 204 are in fluid communication through chamber 228 such that actuator 156 is bled of fluid and gate valve 154 is closed. Fluid passage 244 is in fluid communication with vent port 206 through port 246 and annular chamber 220 in order to exhaust fluid from chamber 106 and permit spring 128 to force piston 104 inwardly to the position shown in FIG. 4. A red color is then visible through lens 142 to provide a visual indication that slide valve 208 is in the closed position to effect closing of gate valve 154.

When slide valve 208 is in the closed position of FIG. 7, a resumption of pilot pressure at port 198 cannot effect movement of the slide valve to the open position since port 198 is in direct fluid communication with vent port 206 through annular chamber 220. Consequently, slide valve 208 must be manually reset to the open position wherein vent port 206 is blanked off between O-rings 222 and 224. In the open position of slide valve 208, O-ring 224 seals ports 200 and 202 from vent port 206, while O-ring 230 seals ports 200 and 202 from bleed port 204. O-ring 222 seals pilot port 198 from vent port 206 in the open position of the slide valve to permit the relay valve 150 to function properly when the slide valve is manually set in its open position.

What is claimed is:

1. A pilot operated relay valve for controlling fluid flow to and from an actuator in response to pressure changes in a pilot line, said relay valve comprising:
   a valve body presenting a longitudinal bore and a piston chamber therein and having a single inlet port adapted for connection with said pilot line to receive fluid therefrom, said body having an outlet port for directing fluid to the actuator and a bleed port for bleeding fluid from the actuator;
   a slide valve mounted in said bore for longitudinal movement between an open position wherein said inlet and outlet ports are in fluid communication to direct fluid to the actuator and a closed position wherein said outlet and bleed ports are in fluid communication to bleed fluid from the actuator, said inlet port being in fluid communication with said piston chamber in the open position of the slide valve to apply the inlet port pressure to the piston chamber for holding the slide valve in the open position;
   an outer end portion of said slide valve located outwardly of the valve body and adapted to be manually pushed to push the slide valve inwardly from the closed position to the open position for manual setting of the slide valve;
   means urging said slide valve outwardly toward the closed position thereof;
   a piston carried on said slide valve in the piston chamber, said piston having an outwardly facing pressure face exposed to the fluid pressure of said inlet port in the open position of the slide valve to hold the slide valve in the open position when the fluid pressure of said inlet port is sufficient to overcome the force of said urging means;
   a vent port formed in the valve body at a location between said inlet port and piston chamber to receive fluid passing from the inlet port toward the piston chamber when said slide valve is in the closed position, thereby preventing application of fluid pressure from the inlet port to the piston chamber in the closed position of the slide valve; and
   means for sealing said vent port from said inlet port and piston chamber when said slide valve is in the open position.

2. A relay valve as set forth in claim 1, including:
   a first seal element located between said inlet and vent ports in the closed position of the slide valve and between said vent port and said piston chamber in the open position of the slide valve;
   a second seal element located between said inlet and outlet ports in the closed position of the slide valve and between said inlet and vent ports in the open position of the slide valve, said first and second seal elements cooperating to provide said sealing means when the slide valve is in the open position; and
   a third seal element located between said bleed port and said outer end of the slide valve in the closed position of the slide valve and between said outlet and bleed ports in the open position of the slide valve.

3. A relay valve as set forth in claim 2, including a fluid passage in said slide valve for directing fluid between said inlet port and piston chamber, said passage having a first port located between said second and third seal elements and a second port located between said first seal element and said piston.

4. A relay valve as set forth in claim 3, wherein said second port of the fluid passage is in direct fluid communication with said vent port in the closed position of the slide valve.

5. A relay valve as set forth in claim 3, including:
   visual indicator means on said outer end of the slide valve, said indicator means having a first condition indicating the open position of the slide valve and a second condition indicating the closed position of the slide valve;

means for effecting the first condition of said indicator means when said fluid passage is exposed to fluid pressure above a predetermined level; and means for effecting the second condition of said indicator means when the pressure in said passage is below said predetermined level.

6. A valve for controlling fluid flow to and from an actuator in response to pressure changes in a pilot line, said valve comprising:

a valve body presenting a longitudinal bore therein, said bore having an enlarged inner end portion defining a piston chamber in the valve body;

a slide valve mounted in the bore for longitudinal movement between an open position for directing fluid to the actuator and a closed position for bleeding fluid from the actuator, said slide valve having an outer and extending outwardly of the valve body and adapted to be manually pushed to push the slide valve inwardly from the closed position to the open position for manual setting of the slide valve;

means biasing the slide valve to the closed position;

a pilot port in the valve body for connection with the pilot line to sense the fluid pressure therein;

a piston carried in said piston chamber on an inner end portion of said slide valve opposite said outer end thereof, said piston presenting an outwardly facing pressure face for receiving pressurized fluid from said pilot port to hold the slide valve in the open position;

a reduced diameter portion of said slide valve providing an annular chamber in said bore about the slide valve, said annular chamber communicating with said pilot port and said piston chamber in the open position of the slide valve to direct fluid against said pressure face of the piston for holding of the slide valve in the open position when manually set therein;

a vent port in said valve body communicating with said annular chamber in the closed position of the slide valve to vent fluid from the annular chamber under all conditions of operation when the slide valve is in the closed position;

means for sealing said annular chamber from said vent port in the open position of the slide valve to prevent said annular chamber from being vented;

a fluid passage having an inlet communicating with said pilot port in the open position of the slide valve and an outlet communicating with said annular chamber to deliver fluid thereto for application to said pressure face of the piston; and means for sealing said pilot port from said fluid passage in the closed position of the slide valve.

7. A valve as set forth in claim 6, including:

visual indicator means mounted on said outer end of the slide valve, said indicator means having a first condition indicating the open position of the slide valve and a second condition indicating the closed position of the slide valve;

means urging said indicator means to the second condition; and means for effecting the first condition of said indicator means when the fluid pressure in said passage is above a predetermined level.

8. A pilot operated relay valve for controlling flow from a fluid source to a valve actuator in response to pressure changes in a pilot line, said relay valve comprising:

a valve body presenting a longitudinal bore having an enlarged portion defining a piston chamber in the valve body;

a slide valve mounted in said bore for longitudinal movement between an open position wherein fluid is directed from said source to said valve actuator and a closed position wherein fluid is bled from the actuator, said slide valve carrying a piston thereon in the piston chamber and having an outer end portion located outwardly of the valve body;

means biasing said slide valve outwardly toward the closed position thereof;

a knob on said outer end portion of the slide valve adapted to be manually pushed to push the slide valve inwardly from the closed position to the open position for manual setting of the slide valve;

a pilot port in said valve body adapted for connection with the pilot line to sense the pressure therein, said pilot port communicating with said piston chamber in the open position of the slide valve to apply the pilot line pressure to said piston for holding of the slide valve in the open position when the pilot line pressure is sufficient to overcome the force of said biasing means;

a reduced size portion of said slide valve providing an annular chamber in said bore about said reduced portion, said pilot port communicating with said annular chamber in the open position of the slide valve;

a fluid passage in said slide valve having a port in said reduced size portion in fluid communication with said annular chamber under all conditions of operation;

visual indicator means on said knob having a first condition indicating the open position of the slide valve and a second condition indicating the closed position of the slide valve;

means effecting the first condition of said indicator means when said passage is exposed to fluid pressure above a predetermined level and the second condition of said indicator means when the pressure in said passage is below said predetermined level; and said slide valve has a second reduced size portion providing a second annular chamber in said bore communicating with the piston chamber in the open position of the slide valve; and said fluid passage has a portion extending in said slide valve between the first mentioned annular chamber and the second annular chamber.

9. A relay valve as set forth in claim 8 including a vent port in the valve body communicating with the second annular chamber in the closed position of the slide valve.

10. A relay valve as set forth in claim 9, including a seal element in said bore forming a seal therein at a location between said pilot port and said vent port in the closed position of the slide valve, said seal element forming a seal in the bore at a location between said vent port and said second annular chamber in the open position of the slide valve to prevent venting of the second annular chamber.

11. A relay valve as set forth in claim 10, including a second seal element in said bore forming a seal therein at a location between said pilot port and said first annular chamber in the closed position of the slide valve, said second seal element forming a seal in the bore at a location between said pilot port and said vent port in the open position of the slide valve.

* * * * *